United States Patent
You

(10) Patent No.: US 11,554,810 B2
(45) Date of Patent: Jan. 17, 2023

(54) APPARATUS AND METHOD FOR CONTROLLING LANE CHANGE USING VEHICLE-TO-VEHICLE COMMUNICATION INFORMATION AND APPARATUS FOR CALCULATING TENDENCY INFORMATION FOR SAME

(71) Applicant: Mando Corporation, Pyeongtaek-si (KR)

(72) Inventor: Hojeong You, Seoul (KR)

(73) Assignee: HL Klemove Corp., Incheon (KR)

( * ) Notice: Subject to any disclaimer, the term of this patent is extended or adjusted under 35 U.S.C. 154(b) by 440 days.

(21) Appl. No.: 16/595,748

(22) Filed: Oct. 8, 2019

(65) Prior Publication Data

US 2020/0108869 A1 Apr. 9, 2020

(30) Foreign Application Priority Data

Oct. 8, 2018 (KR) .................. 10-2018-0120024

(51) Int. Cl.
*B62D 15/02* (2006.01)
*G07C 5/02* (2006.01)
*H04W 4/46* (2018.01)
*G06T 7/50* (2017.01)

(52) U.S. Cl.
CPC ............ *B62D 15/0255* (2013.01); *G06T 7/50* (2017.01); *G07C 5/02* (2013.01); *H04W 4/46* (2018.02); *G06T 2207/30256* (2013.01); *G06T 2207/30261* (2013.01)

(58) Field of Classification Search
CPC .... B62D 15/0255; B62D 15/025; G06T 7/50; G06T 2207/30256; G06T 2207/30261; G07C 5/02; G07C 5/0866; H04W 4/46; B60W 30/18163; B60W 10/20; B60W 30/08; B60W 40/02; B60W 40/09; B60W 50/14; B60W 2050/0054; B60W 2050/146; B60W 2420/42; B60W 2420/506; B60W 2420/54; B60W 2540/10; B60W 2540/12; B60W 2540/18; B60W 2540/30; B60W 2556/45; G08G 1/167; G08G 1/161; H04L 67/12; B60Y 2300/18166

See application file for complete search history.

(56) References Cited

U.S. PATENT DOCUMENTS

| | | | | |
|---|---|---|---|---|
| 9,002,578 B2 * | 4/2015 | Noumura | ............... | B60W 10/11 701/1 |
| 9,135,803 B1 * | 9/2015 | Fields | ................... | B60W 40/08 |
| 10,037,699 B1 * | 7/2018 | Toyoda | .................. | G06N 20/00 |
| 10,676,103 B2 * | 6/2020 | Mangai | ............... | G06F 16/7867 |
| 10,843,690 B2 * | 11/2020 | Shalev-Shwartz | .......................... | B60W 40/105 |

(Continued)

*Primary Examiner* — Angelina Shudy
(74) *Attorney, Agent, or Firm* — Morgan, Lewis & Bockius LLP

(57) ABSTRACT

Disclosed are an apparatus and a method for controlling a lane change using V2V communication information and an apparatus for calculating tendency information for the same. According to the apparatuses and the method, it is possible to improve safety when changing lanes by receiving diving information of drivers of other vehicles from communication modules of the other vehicles, generating tendency information of the drivers of the other vehicles on the basis of the driving information, and performing lane change control using the tendency information.

16 Claims, 8 Drawing Sheets

(56) References Cited

U.S. PATENT DOCUMENTS

| | | | |
|---|---|---|---|
| 10,953,881 B2* | 3/2021 | Ma | G08G 1/167 |
| 10,984,248 B2* | 4/2021 | Shimauchi | G06K 9/00751 |
| 2004/0195022 A1* | 10/2004 | Inoue | B60K 31/0008 |
| | | | 180/170 |
| 2006/0276964 A1* | 12/2006 | Sano | B60W 40/112 |
| | | | 701/300 |
| 2010/0036578 A1* | 2/2010 | Taguchi | B60K 31/0008 |
| | | | 701/93 |
| 2010/0211295 A1* | 8/2010 | Ide | F02D 41/1458 |
| | | | 701/108 |
| 2011/0125367 A1* | 5/2011 | Sakaguchi | B60K 26/021 |
| | | | 701/36 |
| 2012/0143488 A1* | 6/2012 | Othmezouri | G06V 20/58 |
| | | | 701/301 |
| 2013/0054106 A1* | 2/2013 | Schmudderich | G06V 20/58 |
| | | | 701/1 |
| 2014/0113619 A1* | 4/2014 | Tibbitts | B60T 8/172 |
| | | | 455/419 |
| 2015/0307097 A1* | 10/2015 | Steinmeyer | B60W 30/14 |
| | | | 701/70 |
| 2017/0021833 A1* | 1/2017 | Abdel-Rahman | B60W 30/16 |
| 2017/0282922 A1* | 10/2017 | Florentin | B60W 30/1819 |
| 2017/0305434 A1* | 10/2017 | Ratnasingam | B60W 50/14 |
| 2017/0341612 A1* | 11/2017 | Ohmori | B60W 50/12 |
| 2018/0032082 A1* | 2/2018 | Shalev-Shwartz | |
| | | | G01C 21/3602 |
| 2018/0121858 A1* | 5/2018 | Freimuth | G06Q 10/1093 |
| 2018/0233038 A1* | 8/2018 | Kozloski | B64C 39/024 |
| 2018/0257659 A1* | 9/2018 | Nguyen | G07C 5/0816 |
| 2019/0073905 A1* | 3/2019 | Nishimura | G08G 1/0133 |
| 2019/0088137 A1* | 3/2019 | Yamada | B60R 1/06 |
| 2019/0161087 A1* | 5/2019 | Kawabe | B60W 10/04 |
| 2019/0333381 A1* | 10/2019 | Shalev-Shwartz | |
| | | | G06K 9/00825 |
| 2019/0351916 A1* | 11/2019 | Mangai | B60W 50/14 |
| 2019/0377354 A1* | 12/2019 | Shalev-Shwartz | G05D 1/0257 |
| 2019/0382011 A1* | 12/2019 | Bae | B60W 30/18163 |
| 2020/0023841 A1* | 1/2020 | Hayama | B60W 30/09 |
| 2020/0111362 A1* | 4/2020 | Sohn | G08G 1/166 |
| 2020/0231149 A1* | 7/2020 | Eggert | B60W 50/0097 |
| 2020/0290619 A1* | 9/2020 | Mehdi | B60W 60/0011 |
| 2020/0317190 A1* | 10/2020 | Tong | B60W 30/09 |
| 2020/0334762 A1* | 10/2020 | Carver | G06Q 40/08 |
| 2020/0353922 A1* | 11/2020 | Lee | B60W 30/146 |
| 2020/0357369 A1* | 11/2020 | Wu | G10H 1/40 |
| 2021/0039639 A1* | 2/2021 | Song | G06K 9/325 |
| 2021/0061098 A1* | 3/2021 | Parker | G08G 1/0965 |
| 2021/0094577 A1* | 4/2021 | Shalev-Shwartz | |
| | | | B60W 30/0953 |
| 2021/0125076 A1* | 4/2021 | Zhang | G06N 3/0454 |
| 2021/0129868 A1* | 5/2021 | Nehmadi | G01C 21/26 |
| 2021/0173402 A1* | 6/2021 | Chang | B60W 40/09 |
| 2021/0191395 A1* | 6/2021 | Gao | G06V 10/82 |
| 2021/0200229 A1* | 7/2021 | Refaat | G06N 3/084 |
| 2021/0269030 A1* | 9/2021 | Uemura | B62Q 15/025 |
| 2021/0269040 A1* | 9/2021 | Kurokawa | G08G 1/096791 |
| 2021/0325197 A1* | 10/2021 | Ohmura | B60W 30/09 |
| 2022/0001899 A1* | 1/2022 | Kim | B60W 50/0205 |
| 2022/0051038 A1* | 2/2022 | Coimbra De Andrade | |
| | | | G06N 20/00 |
| 2022/0089152 A1* | 3/2022 | Oh | B60W 30/0956 |
| 2022/0126864 A1* | 4/2022 | Moustafa | B60W 50/14 |
| 2022/0126874 A1* | 4/2022 | Oh | B60W 60/0027 |
| 2022/0126882 A1* | 4/2022 | Oh | B60W 40/04 |

* cited by examiner

FIG.2

| Driving information | Description | Allocated points | |
|---|---|---|---|
| Information on number of beats of music | Ratio (third rate value) of reproduction time during which number of beats of music is larger than or equal to A bpm, to total reproduction time | 70%↑ | 5 points |
| | | 50~70% | 4 points |
| | | 30~50% | 3 points |
| | | 10~30% | 2 points |
| | | 10%↓ | 1 points |
| Cruise control setting speed value | Setting ratio of fast/normal/slow while ACC is used | Fast (≥100 km/s) | 3 points |
| | | Normal (80≤V≤100) | 2 points |
| | | Slow (V≤80) | 1 points |
| Accelerator pedal control information | Ratio (first rate value) of number of times by which ratio of amount of control of accelerator pedal to maximum amount of control of accelerator pedal is larger than or equal to 70% (accelerator threshold value) | 70%↑ | 5 points |
| | | 60~70% | 4 points |
| | | 40~60% | 3 points |
| | | 20~40% | 2 points |
| | | 20%↓ | 1 points |
| Brake pedal control information | Ratio (second rate value) of number of times by which ratio of amount of control of brake pedal to maximum amount of control of brake pedal is larger than or equal to 70% (brake threshold value) | 60%↑ | 5 points |
| | | 40~60% | 4 points |
| | | 20~40% | 3 points |
| | | 10~20% | 2 points |
| | | 10%↓ | 1 points |

FIG.3

| Head | Vechile ID | bpm information (third rate value) | SCC setting value | Excel control information (first rate value) | brake control information (second rate value) | Time |

310 — Head / Vechile ID 320 (driving information): 322, 324, 326, 328

FIG.4

| Vehice ID | tendency information (points) | aggression level |
|---|---|---|
| 2X543 | 5 | 2 |
| 3T376 | 13 | 4 |
| 4S475 | 18 | 5 |
| 5K743 | 3 | 1 |
|  |  |  |

APPARATUS AND METHOD FOR CONTROLLING LANE CHANGE USING VEHICLE-TO-VEHICLE COMMUNICATION INFORMATION AND APPARATUS FOR CALCULATING TENDENCY INFORMATION FOR SAME

CROSS REFERENCE TO RELATED APPLICATION

This application claims priority from Korean Patent Application No. 10-2018-0120024, filed on Oct. 8, 2018, which is hereby incorporated by reference for all purposes as if fully set forth herein.

BACKGROUND OF THE INVENTION

1. Field of the Invention

The present disclosure relates to an apparatus and a method for controlling a lane change using vehicle-to-vehicle communication information and an apparatus for calculating tendency information for the same, and more particularly to technology for receiving driving information of a driver of another vehicle from a communication module of the other vehicle, generating tendency information of the driver of the other vehicle through the driving information, and controlling a lane change using the tendency information.

2. Description of the Prior Art

With the recent improvement of vehicle control technology, various Driver Assistance Systems (DAS) are developed, and a function of the DAS system for securing safety of the vehicle or increasing convenience by controlling a steeling angle of the vehicle regardless of a driver's intention is being developed.

The DAS related to steering may include a Lane-Keeping Assistance System (LKAS) for helping the vehicle remain in a driving lane and a Lane-Changing Assistance System (LCAS) for preventing a collision with another vehicle and warning of danger when a lane is changed.

When a driver indicates an intention to change lanes by turning on a turn signal and then moves over the lane to change lanes, the LCAS performs a function of providing a warning to the driver or directly controlling a steering device to prevent the lane change if there is risk of a collision with another vehicle being driven in the lane to which the host vehicle moves to change lanes.

Further, with the recent development of autonomous vehicles, an automatic lane change function by which a controller of the vehicle determines whether to change lanes without intervention of the driver and then changes the lane by controlling the steering device is being developed.

Meanwhile, all drivers driving on the road have different driving tendencies and characteristics. For example, when a driver turns on a turn signal in order to change to an adjacent lane, there is a driver who yields to the other driver and a driver who rather accelerates.

As described above, when the driver changes the lane on the assumption that the driver of the vehicle in the adjacent lane will yield, a collision or an accident may happen if the driver of the adjacent vehicle has aggressive tendencies.

Accordingly, by identifying the driving tendencies or an aggression level of the driver of the adjacent vehicle in a steering control process for changing lanes, the safety of the lane change assistance control can be further increased.

However, at present, there is no method of identifying the diving tendency or aggression level of the diver of the other vehicle.

SUMMARY OF THE INVENTION

With this background, an aspect of the present disclosure is to provide technology for receiving driving information from other vehicles through V2V communication, and analyzing the driving information to recognize tendencies or aggression levels of drivers of the other corresponding vehicles.

Another aspect of the present disclosure is to provide an apparatus and a method for improving safety when changing lanes by determining aggression information of drivers of the other vehicles on the basis of the driving information received from the other adjacent vehicles through V2V communication and performing lane change assistance control or an automatic lane change control using the aggression information.

Still another aspect of the present disclosure is to provide an apparatus and a method for improving safety when changing lanes by determining aggression information of drivers of the other vehicles on the basis of the driving information received from the other adjacent vehicles through V2V communication and varying a parameter on the basis of the aggression information when controlling a lane change.

In accordance with an aspect of the present disclosure, an apparatus for controlling a lane change is provided. The apparatus includes: an image sensor, disposed at the vehicle so as to have a field of view of the exterior of the vehicle, the image sensor capturing image data; a controller comprising a processor configured to process the image data captured by the image sensor; and a diving information receiver configured to receive, from one or more other vehicles, driving information of drivers of the other vehicles through Vehicle-to-Vehicle (V2V) communication, wherein the controller is configured to calculate tendency information of the driver of the other vehicle by analyzing the driving information, determine whether a lane change is possible, responsive at least in part to processing image data captured by the image sensor and the tendency information of the driver of the other vehicle, and perform lane change of a host vehicle by controlling a steering angle of the host vehicle, responsive at least in part to processing image data captured by the image sensor when the lane change is possible.

More specifically, the controller may include a tendency information calculator configured to calculate tendency information of the driver of the other vehicle by analyzing the driving information, a lane change determiner configured to determine whether the lane change is possible based on one or more pieces of information on a distance to a front vehicle or a rear vehicle driven in an adjacent lane to which the host vehicle moves to change lanes, collision prediction time (TTC) information, and the tendency information, and a steering controller configured to perform lane change of the host vehicle by controlling the steering angle of the host vehicle when the lane change is possible.

At this time, the driving information may include one or more of information on a number of beats of music output from the other vehicles, a cruise control setting speed value, accelerator pedal control information, and brake pedal control information.

The accelerator pedal control information may be depth information of an accelerator pedal in a case in which the other vehicle starts in a stopped state while there is no front obstacle, and corresponds to a first rate value, which is a ratio of a number of times that a ratio of an amount of control of an accelerator pedal to a maximum amount of control of the accelerator pedal exceeds an accelerator threshold value to the N number of controls of the accelerator.

Further, the brake pedal control information may correspond to a second rate value, which is a ratio of a number of times that a ratio of an amount of control of a brake pedal to a maximum amount of control of the brake pedal is larger than a brake threshold value to the M number of brake operations.

The information on the number of beats of music may correspond to a third rate value, which is a ratio of a reproduction time, for which the number of beats of the output music is larger than or equal to a beat number threshold value, to a total music reproduction time.

The tendency information may be aggression level information indicating an aggression level of the driver of the other vehicle, and the aggression level information is expressed as a plurality of levels, and the apparatus may further include a display unit configured to display the aggression level information of the other vehicle, wherein the display unit may display display information of both the other vehicle near the host vehicle and the aggression level information of the other vehicle.

The lane change determiner may determine that the lane change is possible only when a distance to a front vehicle driven in an adjacent lane to which the host vehicle moves to change lanes is larger than or equal to a first threshold value, a collision prediction time (TTC) with a rear vehicle driven in the adjacent lane is larger than or equal to a second threshold value, and the aggression level information of the front vehicle or the rear vehicle is equal to or lower than a third threshold value.

Alternatively, when the aggression level information of the front vehicle or the rear vehicle is larger than or equal to a third threshold value, the lane change determiner may determine that the lane change is possible only when a distance to a front vehicle driven in an adjacent lane to which the host vehicle moves to change lanes is larger than or equal to a first threshold value and a collision prediction time (TTC) with a rear vehicle driven in the adjacent lane is larger than or equal to a fourth threshold value, which is larger than a second threshold value.

In accordance with another aspect of the present disclosure, a method of controlling a lane change is provided. The method includes: a driving information reception step of receiving, from one or more other vehicles, driving information of drivers of the other vehicles through Vehicle-to-Vehicle (V2V) communication; a tendency information calculation step of calculating tendency information of the driver of the other vehicle by analyzing the driving information and a lane change determination step of determining whether a lane change is possible based on one or more pieces of information on a distance to a front vehicle or a rear vehicle driven in an adjacent lane to which the host vehicle moves to change lanes, collision prediction time (TTC) information, and the tendency information; and a steering control step of changing lanes by controlling a steering angle of the host vehicle when the lane change is possible.

In accordance with another aspect of the present disclosure, an apparatus for calculating tendency information is provided. The apparatus includes: a driving information receiver configured to receive, from one or more other vehicles, driving information of drivers of the other vehicles through Vehicle-to-Vehicle (V2V) communication; and a tendency information calculator configured to calculate tendency information of the driver of the other vehicle by analyzing the diving information, wherein the driving information includes one or more of information on a number of beats of music output from the other vehicles, a cruise control setting speed value, accelerator pedal control information, and brake pedal control information, and the tendency information calculator calculates the aggression level information indicating an aggression level of the driver of the other vehicle as the tendency information based on one or more of 1) the accelerator pedal control information, which is depth information of an accelerator pedal in a case in which the other vehicle starts in a stopped state while there is no front obstacle, and corresponds to a first rate value, which is a ratio of a number of times that a ratio of an amount of control of an accelerator pedal to a maximum amount of control of the accelerator pedal is larger than an accelerator threshold value to the N number of controls of the accelerator, 2) the brake pedal control information, which corresponds to a second rate value, which is a ratio of a number of times that a ratio of an amount of control of a brake pedal to a maximum amount of control of the brake pedal is larger than a brake threshold value to the M number of brake operations, 3) the information on the number of beats of music which corresponds to a third rate value, which is a ratio of a reproduction time, for which the number of beats of the output music is larger than or equal to a beat number threshold value, to a total music reproduction time, and 4) the cruise control setting speed value.

In accordance with another aspect of the present disclosure, a system for controlling a vehicle to change lanes is provided. The system includes: an image sensor disposed at the host vehicle so as to have a field of view of the exterior of the host vehicle, the image sensor capturing image data; a non-image sensor disposed at the host vehicle so as to detect at least one of objects disposed adjacent to the host vehicle, the non-image sensor detecting sensing data; a domain control unit comprising a processor configured to process at least one of the image data captured by the image sensor and the sensing data detected by the non-image sensor; and a driving information receiver configured to receive, from one or more other vehicles, driving information of drivers of the other vehicles through Vehicle-to-Vehicle (V2V) communication, wherein the domain control unit is configured to calculate tendency information of the driver of the other vehicle by analyzing the driving information, determine whether a lane change is possible, responsive at least in part to processing image data captured by the image sensor, processing sensing data detected by the non-image sensor, and the tendency information of the driver of the other vehicle, and change lanes by controlling a steering angle of the host vehicle when the lane change is possible.

According to an embodiment of the present disclosure described below, it is possible to receive driving information from other vehicles through V2V communication and analyze the driving information to recognize tendencies or aggression levels of drivers of the other corresponding vehicles.

Further, there is an effect of improving safety of the host vehicle when changing lanes by determining aggression information of drivers of the other vehicles on the basis of the driving information received from the other adjacent vehicles through V2V communication and performing lane change assistance control or autonomous lane change control on the basis of the aggression information.

More specifically, there is an effect of improving safety when changing lanes by determining aggression information of drivers of the other vehicles on the basis of the diving information received from the other adjacent vehicles through V2V communication and varying a determination parameter or a control condition in controlling a lane change on the basis of the aggression level information.

BRIEF DESCRIPTION OF THE DRAWINGS

The above and other aspects, features and advantages of the present disclosure will be more apparent from the following detailed description taken in conjunction with the accompanying drawings, in which:

FIG. 2 illustrates an example of calculation of tendency information according to the present embodiment;

FIG. 3 illustrates an example of driving information received through V2V communication according to the present embodiment;

FIG. 4 illustrates an example of table information including calculated tendency information or aggression level information according to the present embodiment;

DETAILED DESCRIPTION OF THE EXEMPLARY EMBODIMENTS

Figure 1:
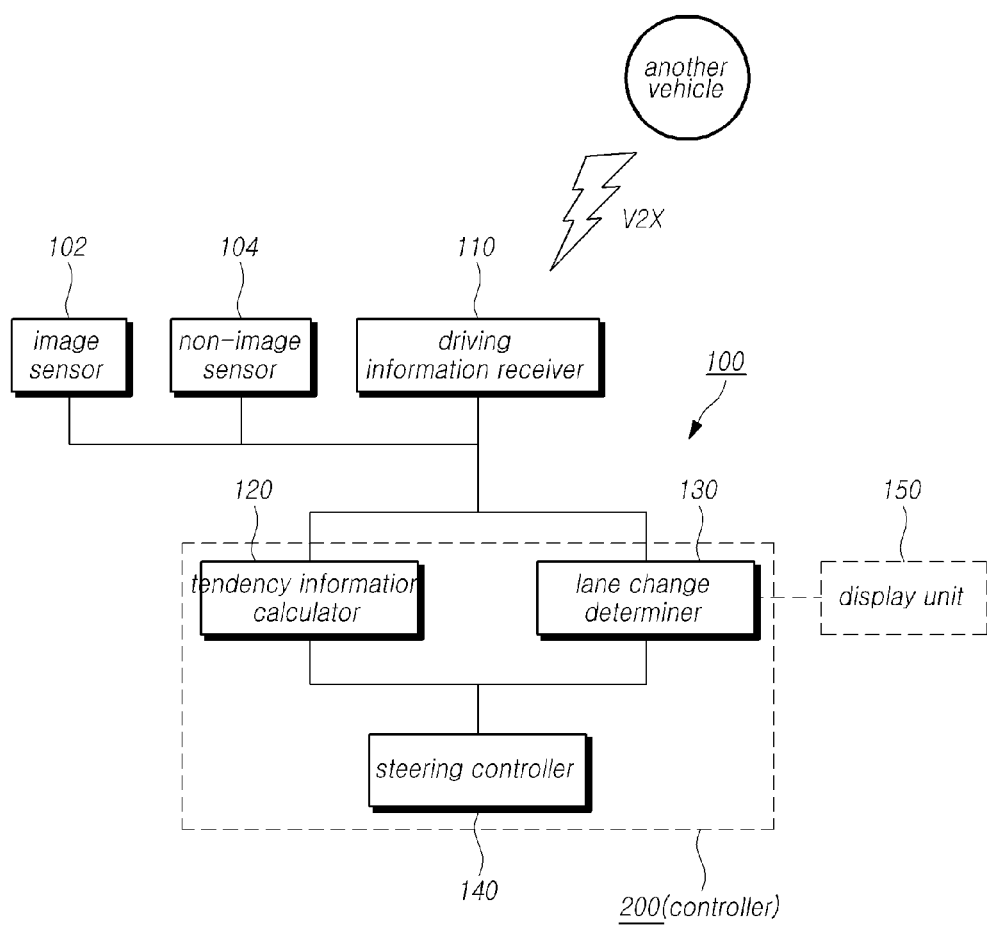
FIG. 1 is a block diagram illustrating functions of an apparatus for controlling a lane change according to the present embodiment.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a block diagram illustrating functions of an apparatus for controlling a lane change according to the present embodiment.

An apparatus 100 for controlling a lane change according to the present embodiment may include a vehicle sensor unit including an image sensor 102 and a non-image sensor 104, a driving information receiver 110, a tendency information calculator 120 for calculating a tendency of a driver of another vehicle, a lane change determiner 130 for determining whether a host vehicle can change lanes, and a steering controller 140 for controlling a lane change, and may further include a display unit 150 for displaying tendency information of another adjacent vehicle.

Among the elements, the tendency information calculator 120, the lane change determiner 130, and the steering controller 140 may be integrated and function as a single controller 200, and the controller 200 may calculate tendency information of a driver of another vehicle by analyzing driving information, determine whether a lane change is possible at least partially on the basis of the tendency information of the driver of the other vehicle and processing of image data captured by the image sensor described below, and perform lane change of the host vehicle by controlling steering of the host vehicle on the basis of at least the image data when the lane change is possible.

The controller 200 may be implemented as a Domain Control Unit (DCU) having a function of receiving and processing information of a plurality of vehicle sensors or relaying transmission/reception of sensor signals and a function of generating lane change control information, transmitting the generated lane change control information to a steeling control module or a brake control module, and controlling a lane change according to the present embodiment, but is not limited thereto.

As described below, the controller 200 functioning as the DCU may calculate tendency information of a driver of another vehicle by analyzing driving information, determine whether a lane change is possible at least partially on the basis of one or more of the tendency information of the driver of the other vehicle, processing of image data captured by the image sensor, and processing of sensing data detected by the non-image sensor, and perform lane change of the host vehicle by controlling a steering angle of the host vehicle when the lane change is possible.

Further, the vehicle according to the present embodiment may include a vehicle image sensor 102 implemented as a camera, an image system, or a vision system. The vehicle image sensor may include a front camera having a field of view in front of the vehicle, a rear camera having a field of view in the rear of the vehicle, and a rear-side camera having a field of view to the side or to the rear-side of the vehicle, and may selectively include one or more cameras in various directions depending on the circumstances.

The camera may perform a function of capturing image data around the vehicle and transferring the image data to a processor or a controller, and the vision system or the image sensor according to the present embodiment may further include an ECU or an image processor having a function of processing the captured image data and displaying the image data on the display.

Further, the vision system or the image sensor according to the present embodiment may further include an appropriate data link or communication link such as a vehicle network bus for data transmission or signal communication from the camera to the image processor. In addition, the vehicle according to the present embodiment may further include the non-image sensor 104 such as a radar sensor or an ultrasound sensor.

The non-image sensor 104 is mounted to the vehicle and has a function of detecting sensing data to detect one of the objects around the vehicle. More specifically, the non-image sensor is a sensor that calculates information on a distance to a target object and a location by transmitting electromagnetic waves such as radar or ultrasonic waves, receiving a signal reflected from the target object, and analyzing the signal.

A radar sensor or a radar system used in the present disclosure may include at least one radar sensor unit, for example, one or more of a front detection radar sensor mounted to the front of the vehicle, a rear radar sensor mounted to the rear of the vehicle, and a side or rear-side detection radar sensor mounted to each side of the vehicle. The radar sensor or the radar system may process data by analyzing a transmitted signal and a received signal and detect information on an object on the basis of the processed data, and may include an electronic control unit (ECU) or a processor therefor. Data transmission or signal communication from the radar sensor to the ECU may be performed through a communication link such as an appropriate vehicle network bus.

The radar sensor includes one or more transmission antennas for transmitting radar signals and one or more reception antennas for receiving reflected signals received from objects.

Meanwhile, the radar sensor according to the present embodiment may adopt a multi-dimensional antenna array and a signal Multiple-Input Multiple-Output (MIMO) transmission/reception scheme in order to form a virtual antenna aperture larger than an actual antenna aperture.

For example, a two-dimensional antenna array is used to achieve horizontal and vertical angular accuracy and resolution. Through the two-dimensional radar antenna array, signals are transmitted/received by two individual horizontal and vertical scans (temporally multiplied), and MIMO may be used separately from the two-dimensional radar horizontal and vertical scans (temporally multiplied).

More specifically, the radar sensor according to the present embodiment may adopt a two-dimensional antenna array consisting of a transmission antenna unit including a total of 12 transmission antennas (Tx) and a reception antenna unit including 16 reception antennas (Rx), and as a result may have a total of 192 virtual reception antenna arrays.

At this time, the transmission antenna unit may include three transmission antenna groups including four transmission antennas, wherein a first transmission antenna group may be vertically spaced apart from a second transmission antenna group by a predetermined distance and the first or second transmission antenna group may be horizontally spaced apart from a third transmission antenna group by a predetermined distance (D).

Further, the reception antenna unit may include four reception antenna groups including four reception antennas, wherein the reception antenna groups may be vertically spaced apart from each other, and the reception antenna unit may be disposed between the first transmission antenna group and the third transmission antenna group, which are horizontally spaced apart from each other.

Further, according to another embodiment, antennas of the radar sensor are disposed in a two-dimensional antenna array. For example, each antenna patch is arranged in the shape of a rhombus, and thus the number of unnecessary side lobes may be reduced.

Alternatively, the two-dimensional antenna array may include a V-shaped antenna array in which a plurality of radial patches is disposed in a V shape, and, more particularly, may include two V-shaped antenna arrays. At this time, a signal feed may be performed at the apex of each V-shaped antenna array.

Alternatively, the two-dimensional antenna array may include an X-shaped antenna array, in which a plurality of radial patches is disposed in an X shape, and, more particularly, may include two X-shaped antenna arrays. At this time, signal feed may be performed at the center of each X-shaped antenna array.

Further, the radar sensor according to the present embodiment may use a MIMO antenna system in order to implement accurate detection and resolution vertically and horizontally.

More particularly, in the MIMO system, respective transmission antennas may transmit signals having independent waveforms distinguished from each other. That is, each transmission antenna may transmit a signal having an independent waveform distinguished from those of other transmission antennas, and each reception antenna may identify which transmission antenna transmits a reflected signal which is reflected from an object due to different waveforms of the signal.

Further, the radar sensor according to the present embodiment may include a radar housing for accommodating a circuit and a substrate including transmission/reception antennas and a radome for configuring the exterior of the radar housing. At this time, the radome is formed with a material which can reduce attenuation of a transmitted/received radar signal, and may constitute a front/rear bumper of the vehicle, a grille, a side frame, or the exterior surface of components of the vehicle.

That is, the radome of the radar sensor may be disposed on a vehicle grille, a bumper, or inside the vehicle. When the radar sensor is disposed as the part of the components constituting the exterior surface of the vehicle, such as the vehicle grille, the bumper, and part of the frame, it is possible to increase the beauty of the vehicle appearance and provide convenience in mounting the radar sensor.

The driving information receiver 110 is a communication module mounted to the host vehicle and performs a function of receiving, from one or more other vehicles, driving information of drivers of the other vehicles through vehicle-to-vehicle (V2V) communication.

To this end, the driving information receiver 110 may use Vehicle-to-Everything (V2X) communication technology, which includes Vehicle-to-Vehicle (V2V) communication technology and Vehicle-to-Infrastructure (V21) communication technology.

V2X communication, which is communication between vehicles used in the present embodiment, means that a vehicle exchanges information with objects, such as another vehicle, a mobile device, and a road through wired/wireless network technology or means the technology itself, and may imply concepts including Vehicle-to-Vehicle (V2V) communication, Vehicle-to-Infrastructure (V21) communication, Vehicle-to-Nomadic device (V2N) communication, and Vehicle-to-Pedestrian (V2P) communication. In the present embodiment, V2V communication in the form of communication between vehicles may be mainly used.

V2X is based on Dedicated Short-Range Communications (DSRC), and may use Wireless Access in Vehicular Environment (WAVE), recently developed by IEEE or IEEE 802.11p communication technology, using a 5.9 GHz band, but is not limited thereto. It should be understood that V2X includes any communication between vehicles that does not exist at present but is to be developed in the future.

The driving information, which the driving information receiver 110 receives from the other vehicle, may be one or more of information on the number of beats of music output from the other vehicle, a cruise control setting speed value, an accelerator pedal control information, and brake pedal control information, and may be periodically transmitted to the outside by a communication module of the other vehicle.

That is, all vehicles periodically transmit driving information, such as the information on the number of beats of music, the cruise control setting speed value, the accelerator pedal control information, and the brake pedal control information used in the present embodiment, to the outside, and other vehicles receive the driving information of the driver of each vehicle together with identification information of the vehicle that transmits the corresponding driving information.

Hereinafter, driving information used to calculate tendency information of the driver of another vehicle will be described in detail.

First, among the driving information, the information on the number of beats of music may be a third rate value, which is a ratio of a reproduction time, for which the number of beats of music output from the other vehicle is larger than or equal to a beat number threshold value, to a total music reproduction time.

For example, the number of beats of music output during a predetermined time (T) through an audio system of the other vehicle may be identified, and a third rate value (T'/T), which is a ratio of a reproduction time (T') during which the number of beats is larger than or equal to a predetermined threshold value (100 bpm) to that for the predetermined time (T) may be defined as the information on the number of beats of music.

When music is reproduced in the vehicle, each vehicle transmits information on the number of beats of the music to another vehicle through V2V communication.

Of course, the information on the number of beats of music is not limited to this definition, but may be information defined in another way to indicate tempo information of the music reproduced in the vehicle.

Among the driving information, the accelerator pedal control information is information indicating how rapidly or how hard the driver of the other corresponding vehicle controls the accelerator.

The accelerator pedal control information is accelerator pedal depth information in the case in which the other vehicle in a stopped state starts while there is no forward obstacle, and may be defined as a first rate value, which is a ratio of the number of times that a ratio of an amount of control of the accelerator pedal to a maximum amount of control of the accelerator pedal is larger than an accelerator threshold value to the N number of controls of the accelerator but is not limited thereto.

For example, when the other vehicle stops to wait for a signal and then starts (when there is no preceding vehicle), that is, when the number of times that the accelerator pedal is controlled to be larger than or equal to 70% (accelerator threshold value) of the maximum amount of control of the accelerator is 4 among 10 times that the accelerator is controlled under a condition in which the accelerator can be controlled as maximum as possible, the first rate value is determined to be 40%.

To this end, the other corresponding vehicle may perform a function of determining a condition under which the vehicle can start in the state in which there is no preceding vehicle after stopping to wait for a signal through a sensor such as a camera and/or a radar and comparing an amount of control of the accelerator at this time with a maximum amount of control of the accelerator.

Of course, it is not necessary to define the acceleration pedal control information, which is the driving information according to the present embodiment, as the first rate as described above. For example, the amount of control of the accelerator itself under the condition in which the accelerator can be controlled as maximum as possible may be transmitted to the outside as the driving information and the vehicle receiving the driving information may calculate the first rate value.

Subsequently, among the driving information, the brake pedal control information is information indicating how rapidly or hard the driver of the other corresponding vehicle presses the brake.

The brake pedal control information is brake pedal control depth information in the case in which the driver of the other vehicle performs a brake operation. The brake pedal control information may be defined as a second rate value, which is a ratio of the number of times that a ratio of an actual amount of control of the brake pedal to a maximum amount of control of the brake pedal is larger than a brake threshold value to the M (M is a natural number of 1 or more) number of controls of the brake, but is not limited thereto.

For example, when the number of times that the brake pedal is controlled to be larger than or equal to 70% (brake threshold value) of the maximum amount of control of the brake is 6 of the 10 times that the brake is controlled, the second rate value is determined to be 60%.

To this end, the other corresponding vehicle may perform a function of comparing the amount of control of the brake pedal in each brake operation with the maximum amount of control of the brake.

Of course, it is not necessary to define the brake pedal control information, which the driving information according to the present embodiment, as the second rate as described above. For example, the amount of control of the brake pedal itself, which is the amount of control of the brake in each brake operation, may be transmitted to the outside as the driving information, and the vehicle receiving the driving information may calculate the second rate value.

Subsequently, the cruise control setting speed value, which is one piece of the driving information, may include a setting speed value in constant speed cruise control or a speed increase/decrease value in Adaptive Cruise Control (ACC).

The cruise control function may include constant speed cruise control, by which the vehicle moves at a constant speed, which is a set speed value determined by the user, and adaptive cruise control, by which the vehicle maintains a predetermined constant distance from a preceding vehicle while following the preceding vehicle.

In the adaptive cruise control, the vehicle controls its speed to maintain a predetermined distance from the preceding vehicle when there is a preceding vehicle and controls the vehicle speed to a target speed set by the driver when there is no preceding vehicle.

Accordingly, the cruise control setting speed value according to the present embodiment may be a target speed value of the constant speed cruise control or the adaptive cruise control in the state in which there is no preceding vehicle.

Further, the cruise control setting speed value according to the present embodiment may be set as a speed increase/decrease, which is increased/decreased from the current vehicle speed to the target vehicle speed by the driver, rather than a detailed speed value.

For example, the cruise control setting speed value may be expressed as "fast change" when the speed rapidly increases or decreases from the current vehicle speed to the target vehicle speed and expressed as "slow change" when the speed slowly increases or decreases.

The driving information according to the present embodiment will be described below in more detail with reference to FIG. 2.

The tendency information calculator 120 performs a function of calculating tendency information of the driver of the other vehicle by analyzing driving information received from the other vehicle.

At this time, the tendency information according to the present embodiment is information indicating how aggressively the driver of the other vehicle drives, and may be aggression level information indicating a degree of aggression of the driver of the other vehicle. The aggression level information may be expressed as a plurality of levels, but is not limited thereto.

The aggression level information, as the tendency information, will be described below in more detail with reference to FIG. 4.

The lane change determiner 130 determines whether a lane change is possible at least partially on the basis of one or more of the tendency information of the driver of the other vehicle, processing image data captured by the image sensor, and processing of sensing data detected by the non-image sensor.

More specifically, the lane change determiner 130 performs a function of determining whether a lane change is possible on the basis of one or more pieces of information on a distance to a front vehicle or a rear vehicle driven in an adjacent lane to which the host vehicle will move to change lanes, collision prediction time (TTC) information, and the tendency information.

More specifically, the lane change determiner 130 may determine whether the lane change is possible in one of the two following ways, but is not limited thereto.

According to the present embodiment, the two types may include a first type of determining whether the lane change is possible in consideration of all of the information on the distance to the front vehicle or the rear vehicle driven in the adjacent lane to which the host vehicle will move to change lanes, the collision prediction time (TTC) information, and the tendency information, and a second type of performing control by increasing a reference value of the collision prediction time (TTC) of the rear vehicle when aggression level information of the rear vehicle is higher than or equal to a predetermined threshold level.

For convenience, the first type is referred to as a normal control type and the second type is referred to as an active control type.

That is, in the normal control mode, which is the first type, the lane change determiner 130 may determine that the lane change is possible only when a distance to a front vehicle driven in an adjacent lane to which the vehicle moves to change lanes is larger than or equal to a first threshold value, a collision prediction time (TTC) with a rear vehicle driven in an adjacent lane is larger than or equal to a second threshold value, and aggression level information of a front vehicle or a rear vehicle is equal to or lower than a third threshold value.

Further, in the active control mode, which is the second type, the lane change determiner 130 may change a determination reference value of the collision prediction time (TTC) with a rear vehicle driven in an adjacent lane from a second threshold value to a fourth threshold value, which is larger than the second threshold value, when aggression level information of a front vehicle or a rear vehicle is higher than or equal to a predetermined threshold level (for example, a third threshold value), and determine that the lane change is possible only when a distance to a front vehicle driven in an adjacent lane is larger than or equal to a first threshold value and the collision prediction time (TTC) with the rear vehicle driven in the adjacent lane is larger than or equal to the fourth threshold value, which is larger than the second threshold value.

When the lane change determiner 130 determines that the lane change is possible in consideration of tendency information of the driver of the other vehicle, the steering controller 140 performs a function of changing lanes by controlling a steering angle of the vehicle and/or a vehicle speed.

More specifically, the steering controller 140 according to the present embodiment may perform a lane change operation by controlling a steering motor of a motor-driven power steering (MDPS) device such as C-EPS or R-EPS.

When it is determined that the lane change is possible, the steering controller 140 recognizes the lane through an image sensor such as a camera installed in the vehicle, calculates a target heading angle which is a diving direction of the vehicle to change lanes and a target current value of the steering motor according thereto, and provides the target heading angle and the target current value to the steering motor.

The steering controller 140 according to the present embodiment may perform both automatic lane change control, such as a lane change by an autonomous vehicle, and lane change assistance control for assisting in performing a lane change according to a steering control by the driver.

Further, when the lane change determiner 130 determines that the lane change is not possible, the apparatus 100 for controlling a lane change according to the present embodiment may output a warning signal to the driver.

Further, when the driver continuously applies a steering force to change lanes even though it is determined that the lane change is not possible, the steering controller 140 may perform control to prevent the lane change by performing inverse steering control in the direction opposite the steering input by the driver.

Meanwhile, the driving information receiver 110, the tendency information calculator 120, the lane change determiner 130, and the steering controller 140 included in the steering control device 100 according to the present embodiment as described above may be implemented as a partial module for configuring the steering control device or the lane change control system according to the present embodiment or a partial module of an ECU therefor.

The partial module or the ECU for configuring the steering control device or the lane change control system may include a process, a storage device such as a memory, and a computer program for performing a specific function, and the diving information receiver 110, the tendency information calculator 120, the lane change determiner 130, and the steeling controller 140 may be implemented as software modules for performing unique functions thereof.

Since the software can be sufficiently coded by those skilled in the art from the matter described in this specification, a description of the detailed form of the software is omitted.

As described above, through the steering control device according to the present embodiment, it is possible to receive/analyze driving information from another adjacent vehicle to analyze a tendency (aggression level) of a driver of the other vehicle and perform lane change control on the basis of the analyzed tendency, so as to improve safety when the lane change is performed.

FIG. 2 illustrates an example of calculation of driving information and tendency information using the driving information according to the present embodiment.

FIG. 3 illustrates an example of driving information received through V2V communication according to the present embodiment.

As illustrated in FIG. 3, driving information according to the present embodiment is information received from another vehicle through V2V communication, and may have a data structure including a header field, a vehicle ID field 310, which is identification information of the other vehicle, and a driving information field 320 according to the present embodiment.

The driving information field 320 may include a field 322 of information on the number of beats of music reproduced in the other vehicle and a field of information on a third rate value, which is a ratio of a reproduction time during which the number of beats of music output from the other vehicle is larger than or equal to a beat number threshold value to a total music reproduction time.

Further, the diving information field 320 may include an accelerator pedal control information field 326, and the accelerator pedal control information field 326 may include, as depth information of the accelerator pedal in the case in which the other vehicle starts in the stopped state while there is no forward obstacle, a first rate value, which is a ratio of the number of times that a ratio of an amount of control of the accelerator pedal to a maximum amount of control of the accelerator pedal is larger than an accelerator threshold value to the N number of controls of the accelerator.

In addition, the driving information field 320 may include a brake pedal control information field 328, and the brake pedal control information field 328 may include information on a second rate value, which is a ratio of the number of times that a ratio of an actual amount of control of the brake pedal to a maximum amount of control of the brake pedal is larger than a brake threshold value to the M number of times the brake is controlled.

Furthermore, the driving information field 320 may include a cruise control setting speed value field 324, and the cruise control setting speed value field 324 may include a setting speed value in the constant speed cruise control and speed increase/decrease information in the Adaptive Cruise Control (ACC).

As illustrated in FIG. 2, the tendency information calculator 120 of the steering control device according to the present embodiment may assign points to the received driving information according to an item of the driving information and calculate tendency information of the driver of the other vehicle as aggression level information.

As illustrated in FIG. 2, 5 points are assigned when, as the information on the number of beats of music reproduced in the other vehicle among the received diving information, the third rate value of the received diving information, which is the ratio of the reproduction time during which the number of beats of music output from the other vehicle is larger than or equal to a beat number threshold value (for example, 100 bpm) to the total music reproduction time is larger than or equal to 70%, 4 points are assigned when the third rate value is 50 to 70%, 3 points are assigned when the third rate value is 30 to 50%, 2 points are assigned when the third rate value is 10 to 30%, and 1 point is assigned when the third rate value is equal to or smaller than 10%.

Further, 5 points are assigned when, as the accelerator pedal control information among the received driving information, that is, the depth information of the accelerator pedal in the case in which the other vehicle starts in the stopped state while there is no forward obstacle, the first rate value of the received driving information, which is the ratio of the number of times that the ratio of the amount of control of the accelerator pedal to the maximum amount of control of the accelerator pedal is larger than an accelerator threshold value (for example, 70%) to the N number of controls of the accelerator is larger than or equal to 70%, 4 points are assigned when the first rate value is 60 to 70%, 3 points are assigned when the first rate value is 40 to 60%, 2 points are assigned when the first rate value is 20 to 40%, and 1 point is assigned when the first rate value is equal to or smaller than 20%.

In addition, 5 points are assigned when the brake pedal control information, among the received driving information, that is, the second rate value of the received driving information, which is the ratio of the number of times that the ratio of the actual amount of control of the brake pedal to the maximum amount of control of the brake pedal is larger than a brake threshold value (for example, larger than or equal to 70%) to the M number of controls of the brake is larger than or equal to 60%, 4 points are assigned when the second rate value is 40 to 60%, 3 points are assigned when the second rate value is 20 to 40%, 2 points are assigned when the second rate value is 10 to 20%, and 1 point is assigned when the second rate value is equal to or smaller than 10%.

Moreover, according to the cruise control setting speed value information among the received diving information, 3 points are assigned when the setting speed value is larger than or equal to 100 km/s or indicates a fast increase, 2 points are assigned when the setting speed value indicates a normal increase or 80 to 100 km/s, and 2 points are assigned when the setting speed value is equal to or smaller than 80 km/s or indicates a slow increase.

FIG. 4 illustrates an example of table information including calculated tendency information or aggression level information according to the present embodiment.

In FIG. 4, aggression levels from level 1 to level 5 may be calculated according to the assigned points from driving information of another corresponding vehicle, and the aggression level information may be used as an example of the tendency information in the same way as that in FIG. 2.

For example, the aggression level information is classified as level 1, indicating the most unaggressive or equable tendency, when the allocated points from the driving information of the other corresponding vehicle are equal to or smaller than 4 points, the aggression level information is classified as level 2 when the points are 5 to 8 points, the aggression level information is classified as level 3 when the points are 9 to 12 points, the aggression level information is classified as level 4 when the points are 13 to 16 points, and the aggression level information is classified as level 5, indicating the most aggressive tendency, when the points are larger than or equal to 17.

The tendency information calculator 120 may calculate and store, in a table form, the aggression level information illustrated in FIG. 4 according to each of all vehicles receiving data, and reception of the diving information and calculation of the tendency information may be performed according to a predetermined period (for example, per week).

For example, as illustrated in FIG. 4, for other vehicle IDs 2X543, 3T376, 4S475, and 5K743 on the basis of driving information received for one week, 5, 13, 19, and 3 points may be calculated as tendency information allocation points and level 2, level 4, level 5, and level 1 may be calculated/stored as aggression levels.

As described above, it may be determined whether to change lanes on the basis of the calculated/stored tendency information or aggression level information, which will be described below in more detail with reference to FIGS. 7 and 8.

Figure 7:
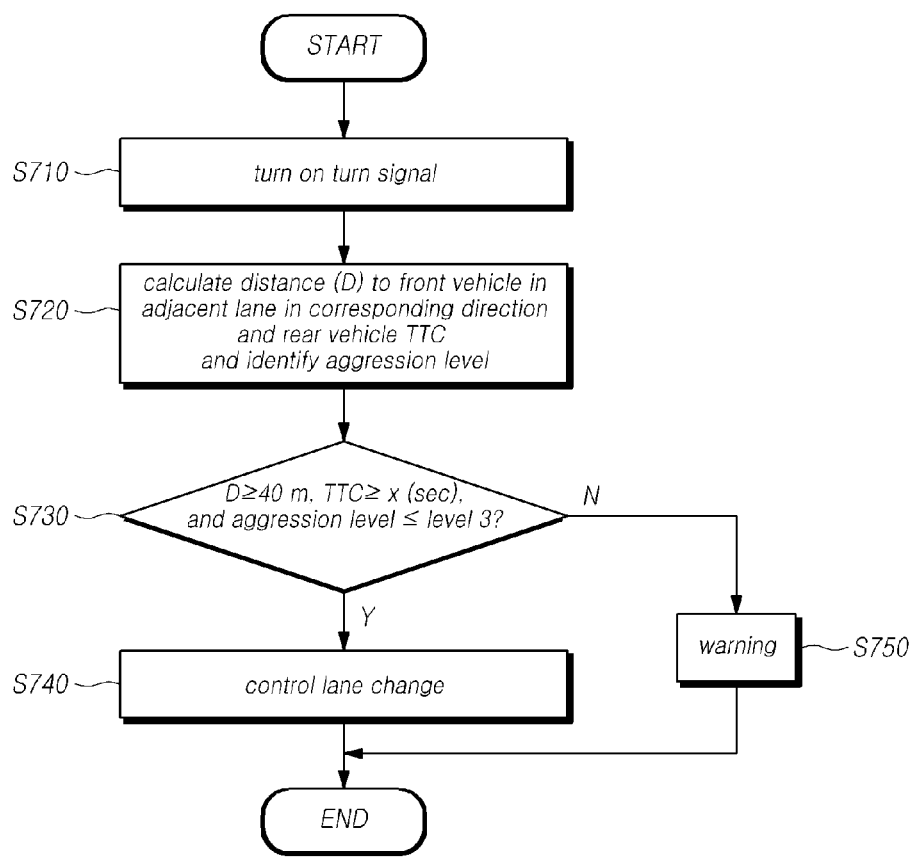
FIG. 7 is a flowchart illustrating a process in a normal control mode, which is a first type of the lane change control, in consideration of tendency information (aggression level information) of another vehicle according to the present embodiment.

FIG. 7 is a flowchart illustrating a process in the normal control mode, which is the first type of lane change control, in consideration of tendency information (aggression level information) of another vehicle according to the present embodiment.

In the normal control mode, which is the first type, the lane change determiner 130 may determine that the lane change is possible only when a distance to a front vehicle driven in an adjacent lane to which the vehicle moves to change lanes is larger than or equal to a first threshold value, a collision prediction time (TTC) with a rear vehicle driven in an adjacent lane is larger than or equal to a second threshold value, and aggression level information of a front vehicle or a rear vehicle is equal to or lower than a third threshold value.

More specifically, as illustrated in FIG. 7, when the turn signal of the host vehicle is turned on and thus intention to change lanes is identified in S710, the apparatus 100 for controlling a lane change according to the present embodiment measures a distance (D) to a front vehicle driven in an adjacent lane to which the vehicle moves to change lanes, calculates a collision prediction time (TTC) with a rear vehicle driven in an adjacent lane, and identifies tendency information (aggression level information) calculated from driving information transmitted from a front vehicle or a rear vehicle in S720.

Subsequently, the lane change determiner determines whether a first condition, in which the distance (D) to the front vehicle is larger than or equal to a first threshold value (for example, 40 m), a second condition, in which the collision prediction time (TTC) of the rear vehicle is larger than or equal to a second threshold value (for example, 2 seconds), and a third condition, in which the aggression level information of the rear vehicle is equal to or smaller than level 3, are satisfied in S730, transmits a lane change command to the steering controller only when all of the three conditions are satisfied, and performs the lane change in S740.

If at least one of the three conditions is not satisfied, it may be determined that the lane change is not possible and a warning signal may be generated in S750.

As described above, in the normal control mode, the apparatus for controlling a lane change secures safety of the lane change by allowing the lane change only when the driver of a rear vehicle does not drive aggressively in consideration of tendency information (aggression level information) of the rear vehicle according to the present embodiment as well as the distance (D) to the front vehicle driven in the adjacent lane and the collision prediction time (TTC) with the rear vehicle.

Figure 8:
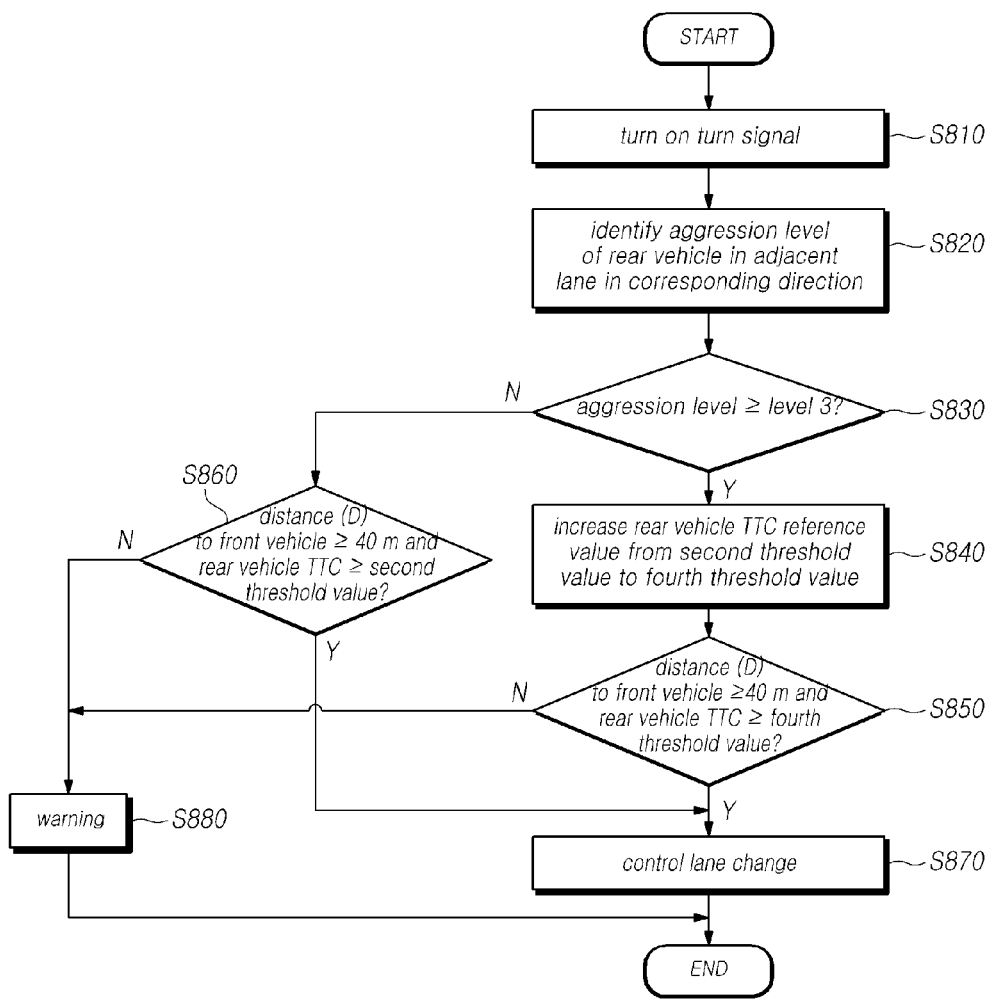
FIG. 8 is a flowchart in an active control mode, which is a second type of the lane change control, in consideration of tendency information (aggression level information) of another vehicle according to the present embodiment.

FIG. 8 is a flowchart in the active control mode, which is the second type of lane change control in consideration of tendency information (aggression level information) of another vehicle according to the present embodiment.

In the active control mode, which is the second type, the lane change determiner 130 may change a determination reference value of the collision prediction time (TTC) with a rear vehicle driven in an adjacent lane from a second threshold value to a fourth threshold value, which is larger than the second threshold value, when aggression level information of a front vehicle or a rear vehicle is higher than or equal to a predetermined threshold level (for example, a third threshold value), and may determine that it is possible to change lanes only when a distance to a front vehicle driven in an adjacent lane is larger than or equal to a first threshold value and the collision prediction time (TTC) with the rear vehicle driven in the adjacent lane is larger than or equal to the fourth threshold value, which is larger than the second threshold value.

Specifically, as illustrated in FIG. 8, when the turn signal of the host vehicle is turned on and thus intention to change lanes is identified in S810, the apparatus for controlling a lane change according to the present embodiment first determines whether the third condition, in which the aggression level information of the rear vehicle driven in the lane to which the host vehicle moves to change lanes is higher than or equal to level 3, is satisfied in S820.

When the aggression level information of the rear vehicle in the adjacent lane is higher than or equal to a predetermined threshold level (level 3) and thus it is determined that the lane change is dangerous in S830, the second threshold value, which is a reference value for determining the collision prediction time of the rear vehicle is increased to the fourth threshold value, which is larger than the second threshold value, in S840.

Subsequently, the lane change command is transmitted to the steering controller and the lane change is performed in S850 and S870 only when the first condition, in which the distance (D) to the front vehicle in the adjacent lane is larger than or equal to the first threshold value (for example, 40 m), and the second condition, in which the collision prediction time (TTC) of the rear vehicle is larger than or equal to the increased fourth threshold value (for example, 4 seconds), are satisfied.

Of course, when the aggression level of the rear vehicle is equal to or lower than a threshold level (level 3) in S830, the lane change control device applies the second threshold value, which is the reference value for determining the collision prediction time of the rear vehicle, and only when the first condition, in which the distance (D) to the front vehicle in the adjacent lane is larger than or equal to the first threshold value (for example, 40 m) and the second condition, in which the collision prediction time (TTC) of the rear vehicle is larger than or equal to the second threshold value (for example, 2 seconds), are satisfied, transmits the lane change command to the steering controller and performs the lane change in S860.

As described above, in the active control mode, when the aggression level information of the rear vehicle driven in the adjacent lane is higher than or equal to a predetermined level, the apparatus for controlling a lane change may control a reference value of the collision prediction time (TTC) with the rear vehicle to determine whether the lane change is possible, so as to pre-emptively prevent a collision with the rear vehicle showing an aggressive driving tendency.

Meanwhile, the driver of the host vehicle may select one of the normal control mode and the active control mode in order to determine a lane change control type in consideration of the aggression level according to the present embodiment.

Figure 5:
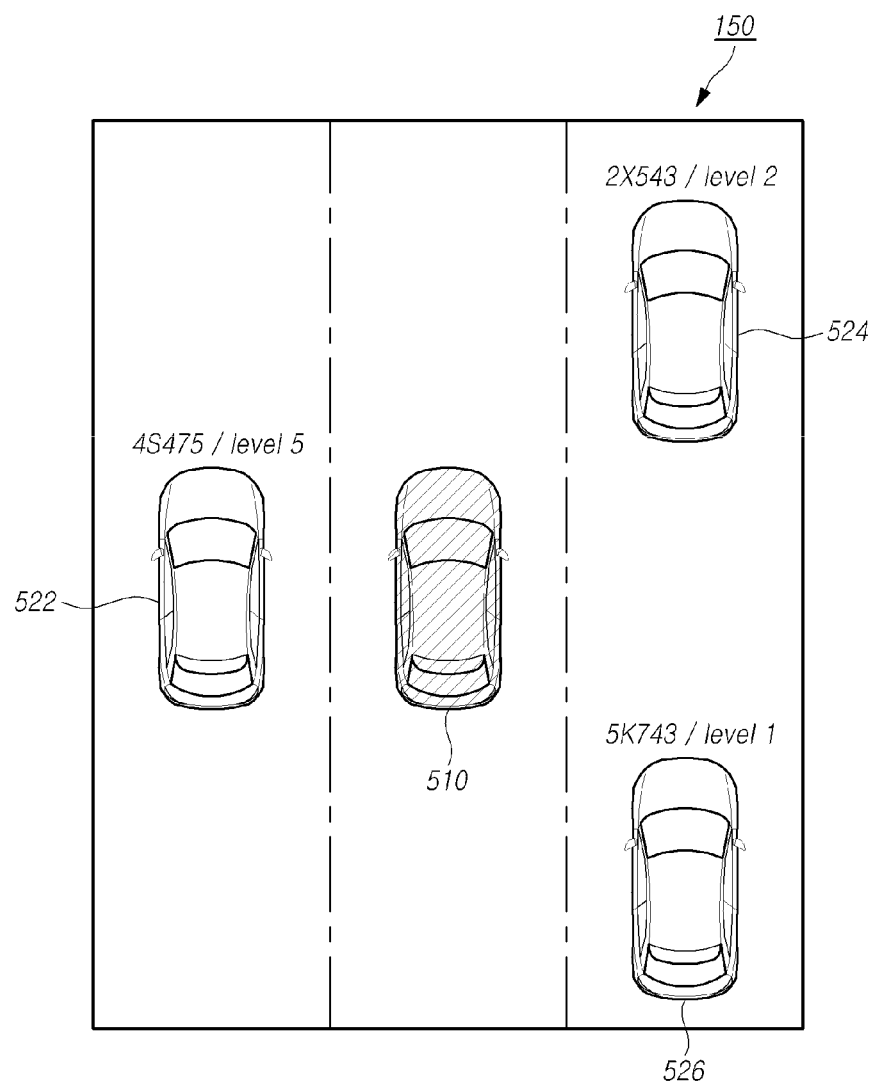
FIG. 5 illustrates an example of a display unit for displaying identification information and tendency information (aggression level information) of another vehicle near the host vehicle according to the present embodiment.

FIG. 5 illustrates an example of the display unit for displaying identification information and tendency information (aggression level information) of another vehicle near the host vehicle according to the present embodiment.

The lane change control device according to the present embodiment may further include the display unit 150 for displaying aggression level information of another vehicle, and the display unit may display display information of the host vehicle and the other vehicle near the host vehicle and aggression level information of the other vehicle.

As illustrated in FIG. 5, the display unit 150 may be implemented using a duster screen of the host vehicle, a head-up display, or a navigation screen, and may display an icon or an image of the host vehicle 510 and icons or images of other vehicles 522, 524, and 526 located in adjacent lanes.

At this time, the display unit 150 may display identification information (ID information) of other vehicles and tendency information (aggression level information) of the corresponding vehicles and allow the driver of the vehicle to check an aggression level of other adjacent vehicles to thus refer to the aggression level for changing lanes or driving the vehicle.

At this time, the display unit may basically display information of all adjacent vehicles, or may selectively display tendency information (aggression level information) of other vehicles selected by a host touch or instruction.

Figure 6:
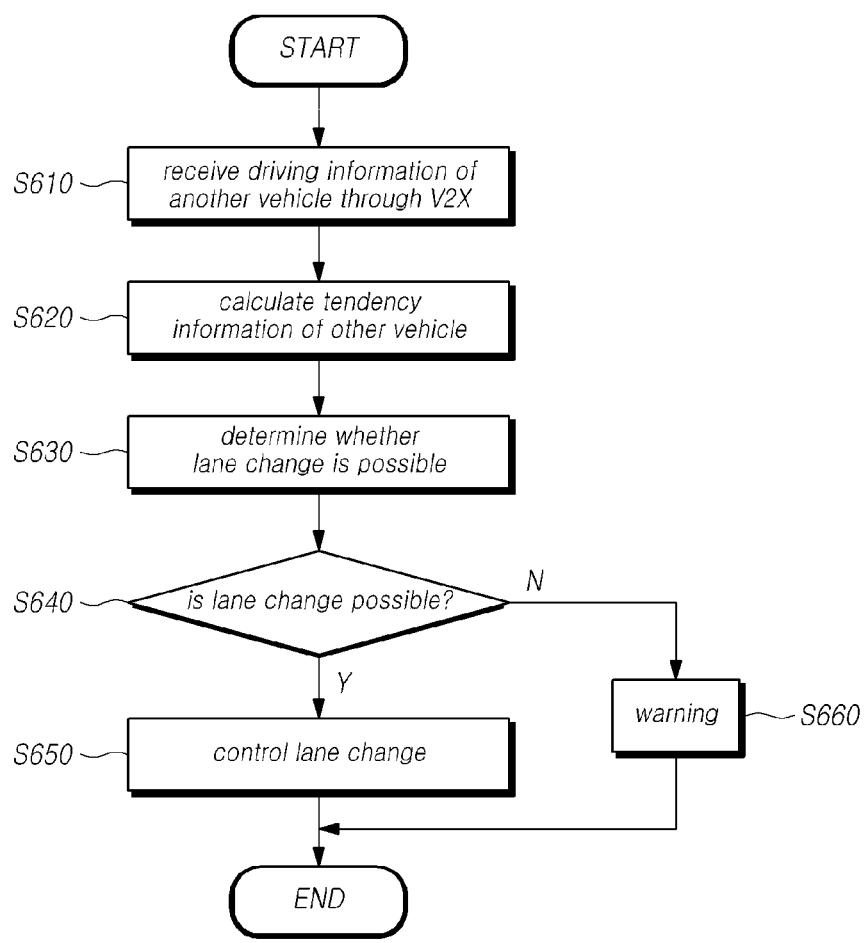
FIG. 6 is a flowchart illustrating a lane change control method according to the present embodiment.

FIG. 6 is a flowchart illustrating the total flow of a lane change control method according to the present embodiment.

The method of controlling a lane change according to the present embodiment may include a driving information reception step S610 of receiving, from one or more other vehicles, driving information of drivers of the other vehicles through V2V communication, a tendency information calculation step S620 of calculating tendency information of the driver of the other vehicle by analyzing the driving information, a lane change determination step S630 of determining whether a lane change is possible based on one or more pieces of information on a distance to a front vehicle or a rear vehicle driven in an adjacent lane to which the host vehicle moves to change lanes, collision prediction time (TTC) information, and the tendency information, and a steering control step S650 of changing lanes by controlling a steering angle of the vehicle when the lane change is possible in S640.

At this time, the driving information may include one or more pieces of information on the number of beats of music output from the other vehicle, a cruise control setting speed value, the accelerator pedal control information, and the brake pedal control information, and the meaning and the calculation method of each piece of the driving information are as described above.

Further, the tendency information calculated in the tendency information calculation step S620 is aggression level information indicating an aggression level of the driver of the other vehicle, and the aggression level information may be expressed as a plurality of levels.

In addition, the lane change control method may further include a display step of displaying the aggression level information of the other vehicle, and display display information of other vehicles around the host vehicle and the aggression level information of the other vehicles may be displayed together in the display step.

Moreover, in the lane change determination step S630, the normal control mode (first type) may be applied to determine that the lane change is possible only when a distance to a front vehicle driven in an adjacent lane to which the vehicle moves to change lanes is larger than or equal to a first threshold value, a collision prediction time (TTC) with a rear vehicle driven in an adjacent lane is larger than or equal to a second threshold value, and aggression level information of a front vehicle or a rear vehicle is equal to or lower than a third threshold value.

Alternatively, when aggression level information of a front vehicle or a rear vehicle is larger than or equal to the third threshold value, the lane change determiner may apply the active control mode (second type) for determining that the lane change is possible only when the distance to the front vehicle driven in the adjacent lane is larger than or equal to the first threshold value and the collision prediction time (TTC) with the rear vehicle driven in the adjacent lane is larger than or equal to a fourth threshold value, which is larger than the second threshold value.

The embodiment of calculating the tendency information (aggression level information) of the driver of the other vehicle on the basis of driving information received through V2V communication and then controlling a lane change on the basis of the calculated tendency information has been described.

However, according to another embodiment, it is construed that a tendency information calculation device including only a diving information receiver and a tendency information calculator may be also included in the scope of this specification, the driving information receiver receiving driving information of drivers of other vehicles from one or more vehicles through V2V communication, the tendency information calculator calculating tendency information of the drivers of the other vehicles by analyzing the driving information.

The driving information calculated by the tendency information calculation device may include one or more of information on a number of beats of music output from the other vehicles, a cruise control setting speed value, accelerator pedal control information, and brake pedal control information, and the tendency information calculator may calculate the aggression level information indicating an aggression level of the driver of the other vehicle as the tendency information, based on one or more of 1) the accelerator pedal control information, which is depth information of an accelerator pedal in a case in which the other vehicle starts in a stopped state while there is no front obstacle and corresponds to a first rate value, which is a ratio of a number of times that a ratio of an amount of control of an accelerator pedal to a maximum amount of control of the accelerator pedal is larger than an accelerator threshold value to the N number of controls of the accelerator, 2) the brake pedal control information, which corresponds to a second rate value, which is a ratio of a number of times that a ratio of an amount of control of a brake pedal to a maximum amount of control of the brake pedal is larger than a brake threshold value to the M number of brake operations, 3) the information on the number of beats of music, which corresponds to a third rate value, which is a ratio of a reproduction time during which the number of beats of the output music is larger than or equal to a beat number threshold value, to a total music reproduction time, and 4) the cruise control setting speed value.

The tendency information calculation device does not have to be used only for the apparatus for controlling a lane change but may be used while being linked to systems and apparatuses in all fields requiting diving tendency information of drivers of vehicles, such as another driver assistance system (DAS) or a traffic control system.

According to the present embodiment as described above, it is possible to receive driving information from other vehicles through V2V communication and analyze the driving information to recognize tendencies or aggression levels of the drivers of the other corresponding vehicles.

Further, there is an effect of improving safety when changing lanes by determining aggression information of drivers of the other vehicles on the basis of the driving information received from the other adjacent vehicles through V2V communication and performing lane change assistance control or autonomous lane change control on the basis of the aggression information.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An apparatus for controlling a lane change, the apparatus comprising:
   an image sensor disposed at a host vehicle so as to have a field of view of an exterior of the host vehicle, and capturing image data;
   a controller of the host vehicle comprising at least one processor configured to process the image data captured by the image sensor; and
   a driving information receiver configured to receive, from one or more other vehicles, driving information of drivers of the one or more other vehicles through Vehicle-to-Vehicle (V2V) communication,
   wherein the controller of the host vehicle is configured to
      calculate tendency information of a driver of a first vehicle among the one or more other vehicles by analyzing the driving information,
      determine whether a lane change is possible, responsive at least in part to processing image data captured by the image sensor and the tendency information of the driver of the first vehicle, and
      perform lane change of the host vehicle by controlling a steering angle of the host vehicle, responsive at least in part to processing image data captured by the image sensor when the lane change is possible,
   the driving information includes a plurality of pieces of information and accelerator pedal control information,
   each piece of information is determined to have a corresponding score based on a value included by said piece of information,
   the tendency information is aggression level information indicating an aggression level, among a plurality of predetermined levels, of the driver of the first vehicle based on a sum of scores of the plurality of pieces of information, and
   the accelerator pedal control information is depth information of an accelerator pedal in a case in which the first vehicle starts in a stopped state while no front obstacle exists and corresponds to a first rate value, which is a ratio of a number of times that a ratio of an amount of control of an accelerator pedal to a maximum amount of control of the accelerator pedal is larger than an accelerator threshold value to the N number of controls of the accelerator.

2. The apparatus of claim 1, wherein the controller is configured to determine whether the lane change is possible based on one or more pieces of information on a distance to a front vehicle or a rear vehicle driven in an adjacent lane to which the host vehicle moves to change lanes, collision prediction time (TTC) information, and the tendency information.

3. The apparatus of claim 1, wherein the driving information includes one or more of information on a number of beats of music output from the one or more other vehicles, a cruise control setting speed value, and brake pedal control information.

4. The apparatus of claim 3, wherein the brake pedal control information corresponds to a second rate value, which is a ratio of a number of times that a ratio of an amount of control of a brake pedal to a maximum amount of control of the brake pedal is larger than a brake threshold value to the M number of brake operations, wherein M is a natural number of one or more.

5. The apparatus of claim 3, wherein the information on the number of beats of music corresponds to a third rate value, which is a ratio of a reproduction time, for which the number of beats of the music output is larger than or equal to a beat number threshold value, to a total music reproduction time.

6. The apparatus of claim 1, further comprising a display unit configured to display the aggression level information of the first vehicle, wherein the display unit displays display information of the first vehicle near the host vehicle and the aggression level information of the first vehicle together.

7. The apparatus of claim 1, wherein the controller is configured to determine that the lane change is possible only when a distance to a front vehicle driven in an adjacent lane to which the host vehicle moves to change lanes is larger than or equal to a first threshold value, a collision prediction time (TTC) with a rear vehicle driven in the adjacent lane is larger than or equal to a second threshold value, and the aggression level information of the front vehicle or the rear vehicle is equal to or lower than a third threshold value.

8. The apparatus of claim 1, wherein the controller is configured to determine that the lane change is possible only when, a distance to a front vehicle driven in an adjacent lane to which the host vehicle moves to change lanes is larger than or equal to a first threshold value and a collision prediction time (TTC) with a rear vehicle driven in the adjacent lane is larger than or equal to a fourth threshold value, which is larger than a second threshold value, when the aggression level information of the front vehicle or the rear vehicle is larger than or equal to a third threshold value.

9. A method of controlling a lane change, the method comprising:
   receiving, from one or more other vehicles, driving information of drivers of the one or more other vehicles through Vehicle-to-Vehicle (V2V) communication;

calculating, by a controller of a host vehicle, tendency information of a driver of a first vehicle among the one or more other vehicles by analyzing the driving information;

determining, by the controller of the host vehicle, whether a lane change is possible based on one or more pieces of information on a distance to a front vehicle or a rear vehicle driven in an adjacent lane to which the host vehicle moves to change lanes, collision prediction time (TTC) information, and the tendency information; and performing, by the controller of the host vehicle, lane change of the host vehicle by controlling a steering angle of the host vehicle when the lane change is possible, wherein the driving information includes a plurality of pieces of information and accelerator pedal control information, each piece of information is determined to have a corresponding score based on a value included by said piece of information, the tendency information is aggression level information indicating an aggression level, among a plurality of predetermined levels, of the driver of the first vehicle based on a sum of scores of the plurality of pieces of information, and the accelerator pedal control information is depth information of an accelerator pedal in a case in which the first vehicle starts in a stopped state while no front obstacle exists and corresponds to a first rate value, which is a ratio of a number of times that a ratio of an amount of control of an accelerator pedal to a maximum amount of control of the accelerator pedal is larger than an accelerator threshold value to the N number of controls of the accelerator.

10. The method of claim 9, wherein the driving information includes one or more of information on a number of beats of music output from the one or more other vehicles, a cruise control setting speed value and brake pedal control information.

11. The method of claim 10, wherein the brake pedal control information corresponds to a second rate value, which is a ratio of a number of times that a ratio of an amount of control of a brake pedal to a maximum amount of control of the brake pedal is larger than a brake threshold value to the M number of brake operations, wherein M is a natural number of one or more.

12. The method of claim of 10, wherein the information on the number of beats of music corresponds to a third rate value, which is a ratio of a reproduction time, for which the number of beats of the music output is larger than or equal to a beat number threshold value, to a total music reproduction time.

13. The method of claim 9, further comprising:
displaying information of the first vehicle near the host vehicle and the aggression level information of the first vehicle together.

14. The method of claim 9, wherein the determining whether a lane change is possible comprises:
determining that the lane change is possible only when a distance to a front vehicle driven in an adjacent lane to which the host vehicle moves to change lanes is larger than or equal to a first threshold value, a collision prediction time (TTC) with a rear vehicle driven in the adjacent lane is larger than or equal to a second threshold value, and the aggression level information of the front vehicle or the rear vehicle is equal to or lower than a third threshold value.

15. The method of claim 9, wherein, the determining whether a lane change is possible comprises:
determining that the lane change is possible only when, a distance to a front vehicle driven in an adjacent lane to which the host vehicle moves to change lanes is larger than or equal to a first threshold value and a collision prediction time (TTC) with a rear vehicle driven in the adjacent lane is larger than or equal to a fourth threshold value, which is larger than a second threshold value, when the aggression level information of the front vehicle or the rear vehicle is larger than or equal to a third threshold value.

16. A system for controlling a vehicle to change lanes, the system comprising:
an image sensor disposed at a host vehicle so as to have a field of view of an exterior of the host vehicle, and capturing image data;

a non-image sensor disposed at the host vehicle so as to detect at least one of objects disposed adjacent to the host vehicle, the non-image sensor detecting sensing data;

a domain control unit of the host vehicle comprising a processor configured to process at least one of the image data captured by the image sensor and the sensing data detected by the non-image sensor;

a driving information receiver of the host vehicle configured to receive, from one or more other vehicles, driving information of drivers of the one or more other vehicles through Vehicle-to-Vehicle (V2V) communication, wherein the domain control unit of the host vehicle is configured to:

calculate tendency information of a driver of a first vehicle among the one or more other vehicles by analyzing the driving information, determine whether a lane change is possible, responsive at least in part to processing image data captured by the image sensor, processing sensing data detected by the non-image sensor, and the tendency information of the driver of the first vehicle, and perform lane change of the host vehicle by controlling a steering angle of the host vehicle when the lane change is possible, the driving information includes a plurality of pieces of information and accelerator pedal control information, each piece of information is determined to have a corresponding score based on a value included by said piece of information, the tendency information is aggression level information indicating an aggression level, among a plurality of predetermined levels, of the driver of the first vehicle based on a sum of scores of the plurality of pieces of information, and the accelerator pedal control information is depth information of an accelerator pedal in a case in which the first vehicle starts in a stopped state while no front obstacle exists and corresponds to a first rate value, which is a ratio of a number of times that a ratio of an amount of control of an accelerator pedal to a maximum amount of control of the accelerator pedal is larger than an accelerator threshold value to the N number of controls of the accelerator.

* * * * *